United States Patent [19]
Kodama et al.

[11] Patent Number: 4,812,423
[45] Date of Patent: Mar. 14, 1989

[54] OPTICAL LIGHT WEIGHT GLASS

[75] Inventors: Hiroyuki Kodama, Kawasaki; Katsumi Mangyo, Yokohama; Takeo Ichimura, Tokyo, all of Japan

[73] Assignee: Nikon Corporation, Tokyo, Japan

[21] Appl. No.: 758,645

[22] Filed: Jul. 17, 1985

[51] Int. Cl.$^4$ .......................... C03C 3/076; C03C 4/00
[52] U.S. Cl. ........................................ 501/55; 501/63; 501/65; 501/66; 501/67; 501/68; 501/69; 501/70; 501/72; 501/903
[58] Field of Search ...................... 501/903, 55, 63, 65, 501/66, 67, 68, 69, 70, 72

[56] References Cited

U.S. PATENT DOCUMENTS

| | | | |
|---|---|---|---|
| 3,898,093 | 8/1975 | Faulstich et al. | 501/903 |
| 4,012,131 | 3/1977 | Krohn et al. | 501/903 |
| 4,036,623 | 7/1977 | Deeg et al. | 501/903 |
| 4,084,978 | 4/1978 | Sagara | 106/54 |
| 4,149,895 | 4/1979 | Doudot et al. | 501/903 |
| 4,367,012 | 1/1983 | Ikeda et al. | 501/903 |
| 4,540,672 | 9/1985 | Boudot et al. | 501/903 |

FOREIGN PATENT DOCUMENTS

| | | | |
|---|---|---|---|
| 40-14308 | 7/1965 | Japan | 501/55 |
| 49-87716 | 8/1974 | Japan . | |
| 56-59640 | 5/1981 | Japan . | |
| 58-145638 | 8/1983 | Japan . | |
| 414073 | 12/1966 | Switzerland | 501/55 |

Primary Examiner—Mark L. Bell
Attorney, Agent, or Firm—Shapiro and Shapiro

[57] ABSTRACT

This specification discloses optical light-weight glass having a composition of $SiO_2$ 47—70, $Li_2O$ 5.5—21, $K_2O$ 2—30, $Na_2O$ 0—30 ($Li_2O+Na_2O+K_2O$ 21—50), $TiO_2$ 9.5—24, $B_2O_3$ 0—20, CaO 0—20, MgO+SrO+BaO+ZnO 0—4, $Al_2O_3$ 0—5 and $ZrO_2+La_2O_3+Ta_2O_5+WO_3$ 0—3, all being in % by weight, and having a refractive index ($n_d$) of 1.58—1.65, an Abbe number ($\gamma_d$) of 35—50 and a specific gravity of 2.69 or less. This optical glass is light in weight, high in transparency and low in dispersion, and is particularly suitable for spectacle lenses, but can also be utilized for photographic lenses.

2 Claims, No Drawings

OPTICAL LIGHT WEIGHT GLASS

BACKGROUND OF THE INVENTION

This invention relates to optical glass which is light in weight, high in transparency, low in dispersion and relatively high in refractive index, and in particular to optical glass comprising a four-indispensable component system of $SiO_2$—$Li_2O$—$K_2O$—$TiO_2$.

Optical glass having a refractive index ($n_d$) of 1.523 and a specific gravity of 2.52 is used for ordinary spectacle lenses. However, spectacle wearers who require their spectacles to be light in weight are gradually increasing. Light-weight plastic lenses are being used instead of glass lenses, but plastic lenses have a disadvantage in that they are easily damaged and thus, the demand for glass lenses is still high. Recently, a spectacle lens having as high a refractive index as about 1.70 has been developed (see U.S. Pat. No. 4,084,978) and has been attracting attention, but this lens has been unsatisfactory from the viewpoint of reduced weight although it has an advantage in that because of its high refractive index, it may be thin even if it is high in refractive power. Conventional high refractive index lenses have a specific gravity of about 3.0 and are very heavy as compared with conventional glass lenses (having a specific gravity of 2.52). Although high refractive index lenses can be made thin, the weight of the entire lens is not reduced much and sometimes it is somewhat increased. In addition, these high refractive index lenses cannot be said to be sufficiently high in transparency and they are generally high in dispersion performance and create great chromatic aberration, which has led to a disadvantage in use in that a rainbow is seen in the lenses.

BRIEF DESCRIPTION OF THE INVENTION

Accordingly, a first object of the present invention is to obtain optical glass which provides a lens which is light in weight, high in transparency and low in dispersion.

The invention is concerned with optical glass of a $SiO_2$—$Li_2O$—$K_2O$—$TiO_2$. It has been found that glass of a composition in the following range provides a lens which has a specific gravity of 2.69 or less, a refractive index ($n_d$) of 1.58–1.65 and an Abbe number ($v_d$) of 35–50 and which is light in weight, high in transparency and low in dispersion.

The present invention provides optical glass having the following composition:

| | |
|---|---|
| $SiO_2$ | 47–70% by weight |
| $Li_2O$ | 5.5–21 |
| $K_2O$ | 2–30 |
| $Na_2O$ | 0–30 |
| $Li_2O + Na_2O + K_2O$ | 21–50 |
| $TiO_2$ | 9.5–24 |
| $B_2O_3$ | 0–20 |
| $CaO$ | 0–20 |
| $MgO + SrO + BaO = ZnO$ | 0–4 |
| $Al_2O_3$ | 0–5 |
| $ZrO_2 + La_2O_3 + Ta_2O_5 + WO_3$ | 0–3 |

The above composition range has been empirically found, and when in the above composition range, $SiO_2$ was less than 47% by weight (hereinafter simply referred to as %), the glass became unstable for devitrification and the viscosity of the glass was reduced, and it was difficult to obtain suitable viscosity during molding, and when $SiO_2$ exceeded 70%, the glass became difficult to melt and at the same time, the refractive index of the glass became lower than the above-mentioned range of refractive index. When $Li_2O$ was less than 5.5%, the refractive index of the glass was reduced and, when $Li_2O$ exceeded 21%, the glass became unstable for devitrification. When $K_2O$ was less than 2%, there wasno phase split suppressing effect and, when $K_2O$ exceeded 30%, the glass became unstable for devitrification and the chemical durability of the glass was also reduced. $Na_2O$ is an arbitrary component, but it was effective in improving the stability for devitrification. However, when $Na_2O$ exceeded 30%, the glass became unstable for devitrification and the chemical durability of the glass was also reduced. When $Li_2O$, $K_2O$ and $Na_2O$ were not 21% or more in total, some of them remained unmolten during the melting and the melting time was prolonged and, when they exceeded 50% in total, the viscosity during the melting was reduced and the glass not only became difficult to mold but also was reduced in stability for devitrification. When $TiO_2$ was less than 9.5%, the refractive index was reduced and, when $TiO_2$ exceeded 24%, the glass became too high in dispersion. $B_2O_3$ is an arbitrary component, but it was effective in reducing the melting temperature and at the same time, keeping the viscosity of the glass moderate and facilitating the molding work. However, when $B_2O_3$ exceeded 20%, the glass became unstable for devitrification. $CaO$ also is an arbitrary component, but it was effective in improving the stability for devitrification. However, when $CaO$ exceeded 20%, the specific gravity of the glass became too great. $MgO$, $SrO$, $BaO$ and $ZnO$ also are arbitrary components, but they were effective in improving the stability for devitrification. However, when they exceeded 4% in total, the specific gravity of the glass became too great. $Al_2O_3$ also is an arbitrary component, but it was effective in preventing phase separation. However, when it exceeded 5%, the tendency toward devitrification became strong. $ZrO_2$, $La_2O_3$, $Ta_2O_5$ and $WO_3$ are arbitrary components, but they were effective in enhancing the refractive index. However, when they exceeded 3% in total, the specific gravity of the glass became too great.

The glass according to the present invention can be manufactured by using corresponding oxide, carbonate, nitrate, etc. as the raw materials of the respective components, weighing them at a desired rate, adding a refining agent to them if required, sufficiently mixing them in powder state and making them into a compound raw material, placing the new material in platinum crucible in an electric furnace heated to 1300°–1400° C., stirring the material and making it uniform after it is melted and refined, and then casting it into an iron mold and gradually cooling it.

BEST MODE FOR CARRYING OUT THE INVENTION

Th composition (all numerical values being % by weight), the refractive index ($n_d$), the Abbe number ($v_d$), the specific gravity and the transparency of an embodiments of the present invention will now be shown.

TABLE 1

| No. | 1 | 2 | 3 | 4 | 5 | 6 | 7 | 8 | 9 | 10 |
|---|---|---|---|---|---|---|---|---|---|---|
| $SiO_2$ | 60 | 47 | 66 | 60 | 54 | 60 | 47 | 50 | 55 | 50 |
| $B_2O_3$ | | | | | | | 19 | | | |
| $Li_2O$ | 7 | 7 | 9 | 5.5 | 7 | 21 | 7 | 7 | 7 | 11 |
| $Na_2O$ | | | | | | | | 24 | | |
| $K_2O$ | 16 | 29 | 12 | 17.5 | 14 | 2 | 14 | 2 | 16 | 15 |
| CaO | | | | | 15.5 | | | | | |
| $Al_2O_3$ | | | | | | | | | 5 | |
| $TiO_2$ | 17 | 17 | 13 | 17 | 9.5 | 17 | 13 | 17 | 17 | 24 |
| $As_2O_3$* | 0.2 | 0.2 | 0.2 | 0.2 | 0.2 | | | | | |
| $n_d$ | 1.59890 | 1.59983 | 1.58301 | 1.59447 | 1.60174 | 1.63289 | 1.59704 | 1.61087 | 1.60072 | 1.64621 |
| $\nu_d$ | 41.25 | 42.12 | 45.09 | 42.04 | 47.12 | 41.22 | 44.39 | 39.45 | 41.83 | 36.32 |
| Transparency** | 369/349 | 368/348 | 365/345 | 370/349 | 372/350 | 370/351 | 365/347 | 372/351 | 370/350 | 378/357 |
| Specific Gravity | 2.57 | 2.59 | 2.52 | 2.57 | 2.65 | 2.54 | 2.55 | 2.66 | 2.57 | 2.65 |

*$As_2O_3$ is added by 0.2% to total 100% of the other raw materials (Nos. 1–5).
**Transparency is shown with the wavelength exhibiting a transmission factor of 80%/50% for glass having a thickness of 10 mm as the unit nm.

Of the glass compositions of the present invention described above, a composition in which $Na_2O$ is 0–20%, $TiO_2$ is 9.5–20% and CaO is 0–4% can preferably provide optical glass having a refractive index ($n_d$) of 1.58–1.64, an Abbe number ($\nu_d$) of 39–50 and a specific gravity of 2.59 or less.

The properties of spectacle lenses made of various types of glass are compared as follows:

TABLE 2

| Physical Properties | Lens for Ordinary Specs | Lens for High Refractive Index Specs | Example of the Invention |
|---|---|---|---|
| Refractive Index ($n_d$) | 1.523 | 1.701 | 1.600 |
| Specific Gravity | 2.54 | 3.05 | 2.57 |
| Lens Diameter (mm) | 50 | 50 | 50 |
| Refractive Power (D) | −5   +5 | −5   +5 | −5   +5 |
| Lens weight (g) | 12.9  22.6 | 13.1  20.4 | 12.1  20.3 |

Note: In the lenses having a negative refractive power, calculation was carried out with the center thickness as constant, and in the lenses having a positive refractive power, calculation was carried out with the edge thickness as constant.

The optical glass of the present invention is not only suitable for use for spectacle lenses, but also can be utilized for photographic lenses.

What is claimed is:

1. Optical lens of light-weight glass consisting essentially of the following composition in % by weight and having a refractive index ($n_d$) of 1.58 through 1.65, and Abbe number ($\nu_d$) of 35 through 50 and a specific gravity of 2.69 or less:

| | |
|---|---|
| $SiO_2$ | 47–70 |
| $Li_2O$ | 5.5–21 |
| $K_2O$ | 2–30 |
| $Li_2O + K_2O$ | 21–50 |
| $TiO_2$ | 9.5–24 |
| CaO | 0–20 |
| $MgO + SrO + BaO + ZnO$ | 0–4 |
| $Al_2O_3$ | 0–5 |
| $ZrO_2 + La_2O_3 + Ta_2O_5 + WO_3$ | 0–3. |

2. The lens of claim 1, wherein the proportions of two of the components are as follows in % by weight, $n_d$ is within the range 1.58 through 1.64, $\nu_d$ is within the range of 39 through 50 and specific gravity is 2.59 or less:

| | |
|---|---|
| $TiO_2$ | 9.5–20 |
| CaO | 0–4. |

* * * * *